March 19, 1957  B. W. SWANSON  2,785,476
THREAD COMPARATOR
Filed Oct. 7, 1953

INVENTOR.
BROR W. SWANSON
BY
Lindsey and Prutzman
ATTORNEYS

2,785,476
THREAD COMPARATOR

Bror Walter Swanson, New Britain, Conn., assignor to The Whitney Chain Company, Hartford, Conn., a corporation of Connecticut Application October 7, 1953, Serial No. 384,643

6 Claims. (Cl. 33—199)

The present invention relates to a comparator for gaging threads, and it is a principal object of the invention to provide such a comparator which is particularly arranged to permit interchangeability of the thread contacting elements therein without disassembly of the comparator.

Another object of the invention is to provide a thread gaging comparator which is particularly arranged to allow the replacement of either or both of the dies or gaging elements therein without impairing the accuracy of the comparator in subsequent gaging operations.

Another object is to provide a thread gaging comparator having improved suitability for conveniently interchanging dies of different sizes, or for replacing worn or damaged dies, without disassembling of the entire comparator.

Another object is to provide a comparator having improved means for insuring accurate alignment of the threads on the gaging elements assembled therein.

Another object is to provide a comparator in which a pair of gage elements may be removed and replaced quickly and conveniently, and in which absolute alignment of the threads of the replacement gage elements will be insured.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
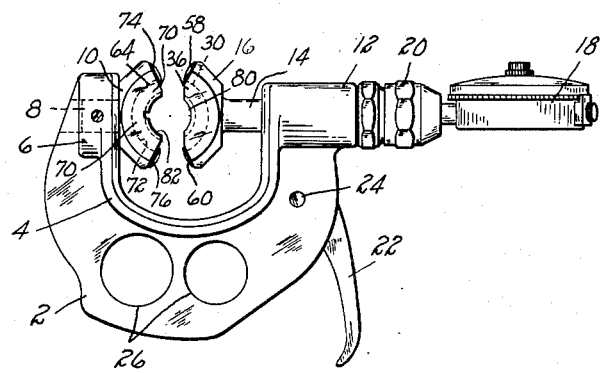
Figure 1 is an outline view of a thread comparator constructed in accordance with the present invention.
Figure 2:
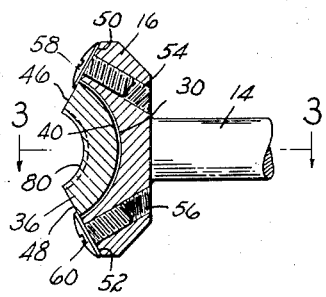
Figure 2 is a sectional view to an enlarged scale of a portion of the comparator shown in Figure 1, showing the details of assembly.

A thread comparator constructed in accordance with the present invention is shown in Figure 1 and includes a rigid C-shaped handle 2 having a heavy reinforcing flange 4 along its inner peripheral edge. At one end of the C-shaped handle 2 is provided a bushing 6 within which is secured a fixed stem 8 carrying a fixed anvil 10. At the other end of handle 2 is provided a bushing 12 enclosing a bearing sleeve, not shown, within which is a movable stem or plunger 14. Stem 14 is slidably supported in coaxial alignment with fixed stem 8, for relative reciprocation on a common axis therewith, and carries a traveling anvil 16 which cooperates with the fixed anvil 10 in a manner hereafter described.

The traveling anvil 16 is biased toward fixed anvil 10 by the usual compression spring, not shown, carried within the outer end of bushing 12, and the relative position of traveling anvil 16 is shown by the usual dial indicator 18 clamped in bushing 12 by fittings 20.

For retracting traveling anvil 16 away from fixed anvil 10 there is provided the usual thumb lever 22 which is pivotally connected by pin 24 to handle 2, and which at its inner end, not shown, engages a pin projecting from plunger 14, for reciprocation thereof. Finger holes 26 are provided in handle 2 to permit the same to be conveniently held in the hand.

Figure 3:
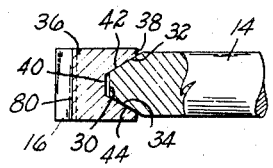
Figure 3 is a sectional view of the structure shown in Figure 2 taken on the line 3—3 thereof.
Figure 4:
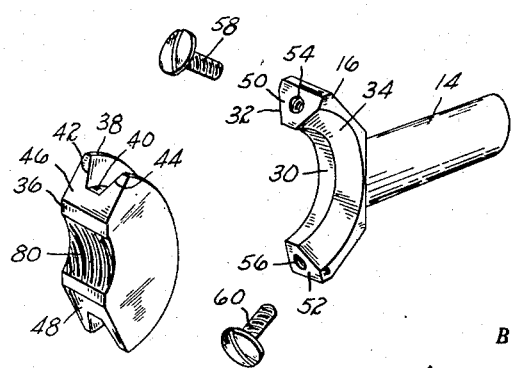
Figure 4 is an exploded perspective view of the structure shown in Figure 2.

The traveling anvil 16 has an outwardly concave surface 30 disposed opposite fixed anvil 10. The surface 30 is shaped in the form of a segment of a cylinder, and its center of curvature is on the axis of relative reciprocation of the stems. Surface 30 is beveled along both of its arcuate edges to provide a pair of spaced arcuate ways 32, 34 which slope toward each other, as shown particularly in the cross-sectional view of Figure 3. Ways 32, 34 are turned from a center on the axis of relative reciprocation of stems 8, 14, and are symmetrically disposed relative to a plane containing this axis.

Adapted to be mounted on anvil 16 is a gage element or die 36 of generally arcuate or semi-circular shape, provided in its outside face 38 with an annular slot 40 of V-shaped cross section, having sloping side walls 42, 44 sized and shaped to receive and mate with the sloping arcuate ways 32, 34 of traveling anvil 16. The arcuate length of gage element 36 is such that its ends 46, 48 line up with the ends 50, 52 of the anvil 16.

At its ends 50, 52, the traveling anvil is provided with bores 54, 56 threaded to receive screws 58, 60, the head of each screw being sized to overlap the adjacent end of the element 36 and retain the same securely in mating relation with the ways 32, 34. It may be seen that by this arrangement gage element 36 is accurately and rigidly positioned relative to traveling anvil 16 by means of the mating surfaces of the ways 32, 34 and the sides 42, 44 of the annular slot 40. Yet, as will be apparent, gage element 36 can be easily and simply removed and replaced at any time by merely loosening the screws 58, 60 at each end of traveling anvil 16.

The fixed anvil 10 is likewise provided with a concave surface 64 confronting traveling anvil 16, shaped in the form of a segment of a cylinder, and beveled along its edges to provide a second pair of arcuate ways tapered or sloping in cross section, and of equal radii of curvature with ways 32, 34, and likewise centered on the axis of relative movement of stems 8, 14. Another gage element or die 70 is adapted to be carried by fixed anvil 10 for cooperation with the gage element 36 on traveling anvil 16. Gage element 70 is provided with an annular slot 72 of V-shaped cross section in its outer face, having sloping sides similar to those of slot 40 in gage element 36. The fixed anvil is also provided at its ends with bores threaded to receive screws 74, 76, whose heads are sized to firmly clamp the gage element 70 into mating locating connection with the ways of fixed anvil 10. Like gage element 36, gage element 70 can be quickly and conveniently removed from the comparator by simply loosening the two screws 74, 76, and yet is accurately and securely positioned on fixed anvil 10 by the coaction of its ways and the sides of slot 72.

On the inside or adjacent faces of the gage elements 36, 70 are provided thread segments 80, 82, concentric with the V-shaped annular slots 40, 72, and adapted to cooperatively embrace the threads of a test piece to be gaged at diametrically opposed points thereon.

From a consideration of the above-described structural arrangement, it will be recognized that it is a particular feature of the present invention that either or both of the gage elements 36, 70 may be quickly and easily removed from its respective anvil and replaced. This is a highly advantageous arrangement, in that it permits interchangeability of gage elements of different sizes, enabling a single comparator to be used in a multitude of different gaging operations merely by the insertion of the proper size dies or gage elements. Also, replacement of either gage element because of wear, damage, or the like, can be quickly and conveniently accomplished without disturbing of the other gage element or without disassembly of any of the remainder of the comparator. The structural arrangement above-described also makes such a feature not only possible, but practical from the standpoint of gaging accuracy, by insuring that if either or both gage elements are removed and replaced, the mutual alignment of the freshly inserted elements, or of a single freshly inserted element with that already installed, is preserved with the same degree of accuracy as had previously existed before the replacement. This guarantee of alignment with absolute accuracy, regardless of how often replacements are made, is provided by the exact mating relationship of the arcuate ways on the anvils and the co-acting sides of the slots 40, 72 in gage elements 36, 70.

The structural arrangement above described particularly lends itself to the attainment, during manufacture, of a high degree of precision in aligning the gage elements. During manufacture the ways of the fixed and traveling anvil can conveniently be ground and lapped simultaneously after assembly in the comparator handle 2, thus providing a matched pair of anvils in which the two pairs of ways are absolutely concentric and have equal radii of curvature. Moreover, during manufacture, individual gage elements can be mounted in a master fixture, and their threads can be chased and then lapped by the insertion of a lapping die while so mounted, thus insuring perfect alignment of the threads when the gage elements are later installed in a comparator. Thus absolute alignment of the threads on a pair of gage elements when installed on the anvils of a comparator is insured, and either or both gage elements 36, 70 can be replaced or interchanged with others of different size without danger of loss of alignment or impairment of the accuracy of the comparator.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a thread comparator having a support enclosing a fixed stem and a reciprocable stem and means for relatively moving said stems on a common axis and for indicating their relative spacing, a fixed anvil on said fixed stem and a cooperative traveling anvil on said reciprocable stem, each of said anvils having a pair of sloping arcuate ways, said pairs of ways having centers aligned parallel to said axis, a gage element for each of said anvils having in its outside surface an arcuate slot of tapered cross section adapted to receive and seat on said ways, means for clamping each of said gage elements on its respective anvil, and cooperative thread segments on each of said gage elements.

2. In a thread comparator having a support enclosing a fixed stem and a reciprocable stem and means for relatively moving said stems on a common axis and for indicating their relative spacing, a fixed anvil on said fixed stem and a cooperative traveling anvil on said reciprocable stem, each of said anvils having a concave surface beveled along its edges to provide a pair of sloping arcuate ways, said pairs of ways having centers aligned parallel to said axis, a gage element for each of said anvils having in its outside surface an arcuate slot of tapered cross section adapted to receive and seat on said ways, means for clamping each of said gage elements on its respective anvil, and cooperative thread segments on each of said gage elements.

3. In a thread comparator having a support enclosing a fixed stem and a sliding stem and means for relatively moving said stems in coaxial alignment and for indicating their relative spacing, a fixed anvil on said fixed stem and a traveling anvil on said sliding stem, each of said anvils having a pair of segmental circular ways disposed in V-shaped cross section, said pairs of ways being centered on a line parallel to the axis of relative movement of said stems, said ways of each pair being symmetrical with a plane through said axis, a gage element for each of said anvils having in one face a segmental circular slot of V-shaped cross section adapted to mate with said ways, means for detachably clamping each of said gage elements in mated relation with its respective anvil, and cooperative thread elements on each of said gage elements concentric with said slots.

4. In a thread comparator having a support enclosing a fixed stem and a reciprocable stem and means for relatively moving said stems on a common axis and for indicating their relative spacing, a fixed anvil on said fixed stem and a cooperative traveling anvil on said reciprocable stem, each of said anvils having a concave surface beveled along its edges to provide a pair of sloping arcuate ways, said ways having equal radii of curvature and being turned from centers aligned parallel with said axis, a gage element for each of said anvils having an arcuate slot in one face, said slots having the same radii of curvature and having sides complementarily sloped to mate in locating relation with said anvil ways, threads in each gage element concentric with said slot, and means for clamping each of said gage elements on its respective anvil.

5. In a thread comparator having a support enclosing a fixed stem and a reciprocable stem coaxially aligned therewith and means for relatively moving said stems and for indicating their relative spacing, a fixed anvil on said fixed stem and a cooperative traveling anvil on said reciprocable stem, each of said anvils having an outwardly concave surface beveled along its edges to provide a pair of relatively inclined arcuate ways, said ways of each pair being symmetrical with a common plane through the axis of said stems, a gage element for each of said anvils having in its outside surface an arcuate slot of tapered cross section adapted to receive and seat on said ways, means on said anvils for detachably clamping each of said gage elements in seated relation and thread segments on each of said gage elements concentric with said arcuate slots.

6. In a thread comparator having a support enclosing a fixed stem and a reciprocable stem coaxially aligned therewith and means for relatively reciprocating said stems and for indicating their relative spacing, a fixed anvil on said fixed stem and a cooperative traveling anvil on said reciprocable stem, each of said anvils having an outwardly concave surface beveled along its edges to provide a pair of semi-circular ways relatively disposed in V-shaped cross section, said ways having the same radius of curvature with the ways of each pair being symmetrical with a common plane through the axis of said stems, a gage element for each of said anvils having in one face a complementary annular slot of V-shaped cross section adapted to receive and seat on said ways in rigid locating relation, detachable means for clamping each of said gage elements on its respective anvil, and thread segments on each of said gage elements concentric with said annular slots.

References Cited in the file of this patent

UNITED STATES PATENTS

| | | |
|---|---|---|
| 1,129,260 | Wells | Feb. 23, 1915 |
| 1,337,018 | Lockey et al. | Apr. 13, 1920 |
| 2,341,679 | Wildermuth | Feb. 15, 1944 |
| 2,588,431 | Swanson | Mar. 11, 1952 |